United States Patent [19]

Koontz

[11] 4,007,316
[45] Feb. 8, 1977

[54] DEFERRED ACTION BATTERY HAVING AN IMPROVED DEPOLARIZER

[75] Inventor: Ralph F. Koontz, Fort Wayne, Ind.

[73] Assignee: The Magnavox Company, Fort Wayne, Ind.

[22] Filed: Nov. 19, 1975

[21] Appl. No.: 633,536

[52] U.S. Cl. .............................. 429/118; 429/220; 429/229
[51] Int. Cl.² ........................................ H01M 6/00
[58] Field of Search ............ 136/100 M, 100 R, 23, 136/30, 137

[56] References Cited
UNITED STATES PATENTS

| | | | |
|---|---|---|---|
| 2,306,927 | 12/1942 | Arsem | 136/137 |
| 2,874,204 | 2/1959 | Morehouse et al. | 136/100 M |
| 3,258,367 | 6/1966 | Robinson | 136/100 M |
| 3,303,054 | 2/1967 | Gruber et al. | 136/100 M X |
| 3,450,570 | 6/1969 | Root | 136/120 |

*Primary Examiner*—T. Tung
*Assistant Examiner*—C. F. LeFevour
*Attorney, Agent, or Firm*—Thomas A. Briody; William J. Streeter; George R. Pettit

[57] ABSTRACT

A deferred action battery having a magnesium alloy anode and a cathode depolarizer. The depolarizer can comprise one of the following materials: copper oxalate, copper formate, or copper citrate and copper tartrate. In addition, the depolarizer contains a form of carbon, a binder, and a metal grid used as a current collector and a base for the cathode.

14 Claims, 4 Drawing Figures

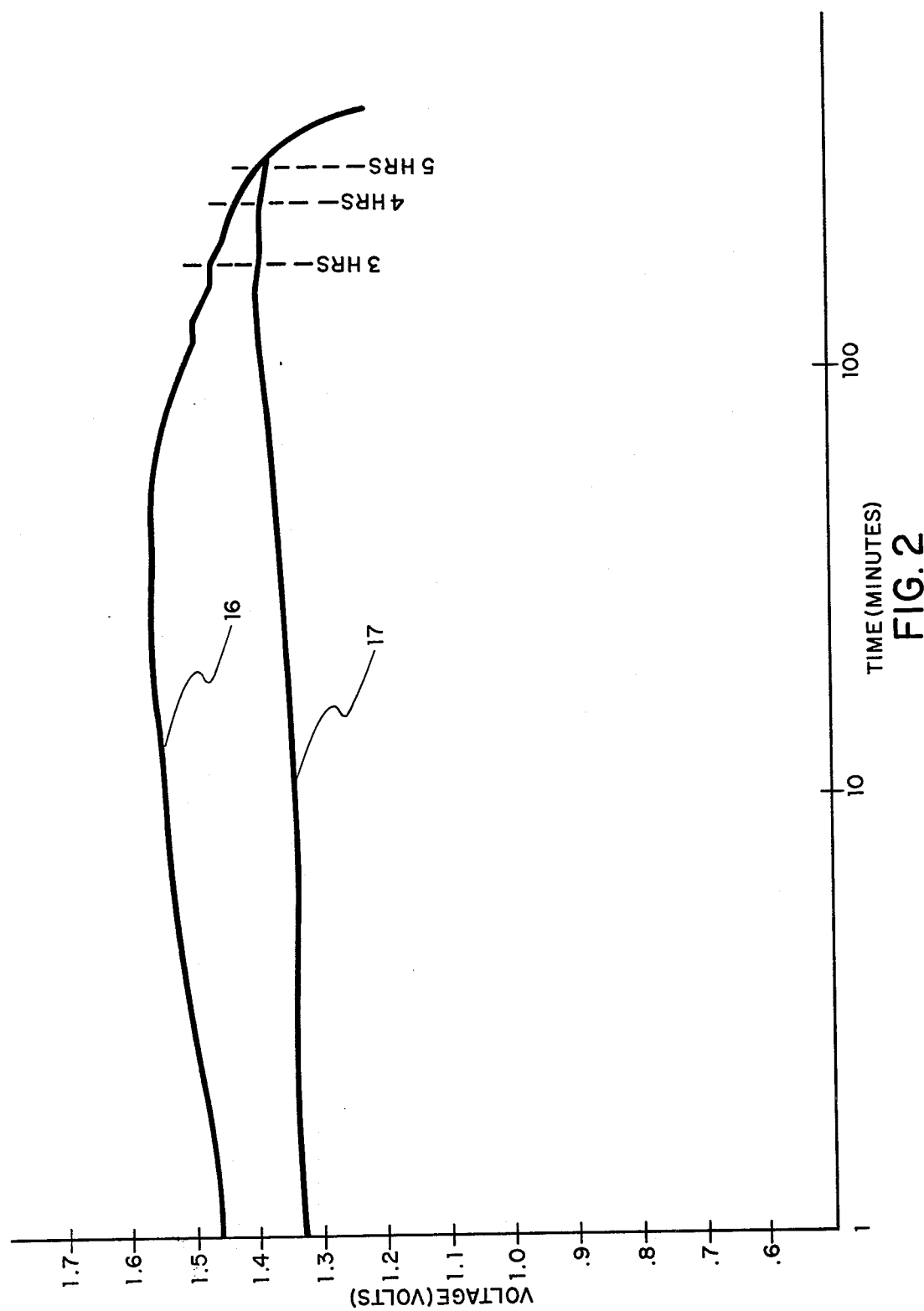

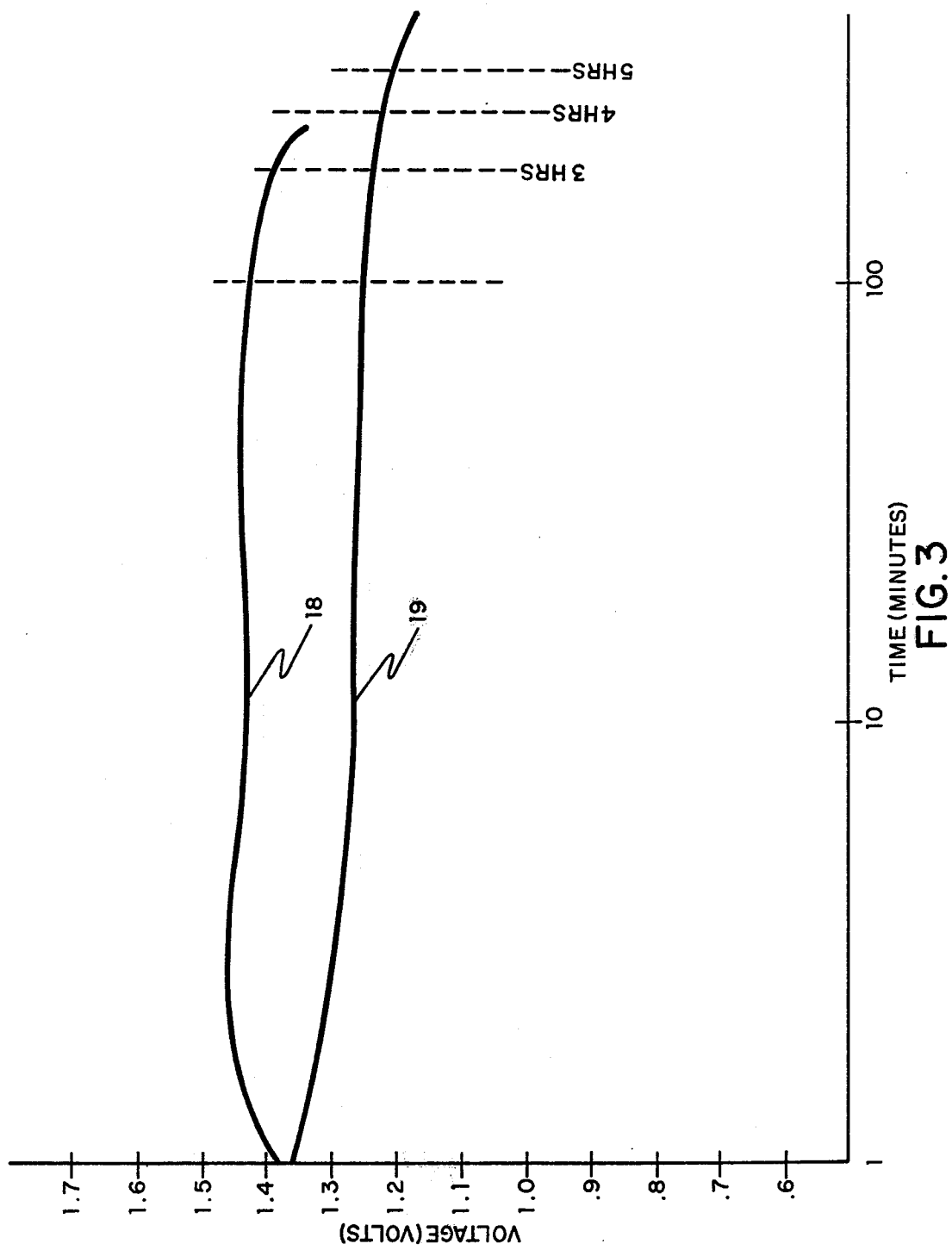

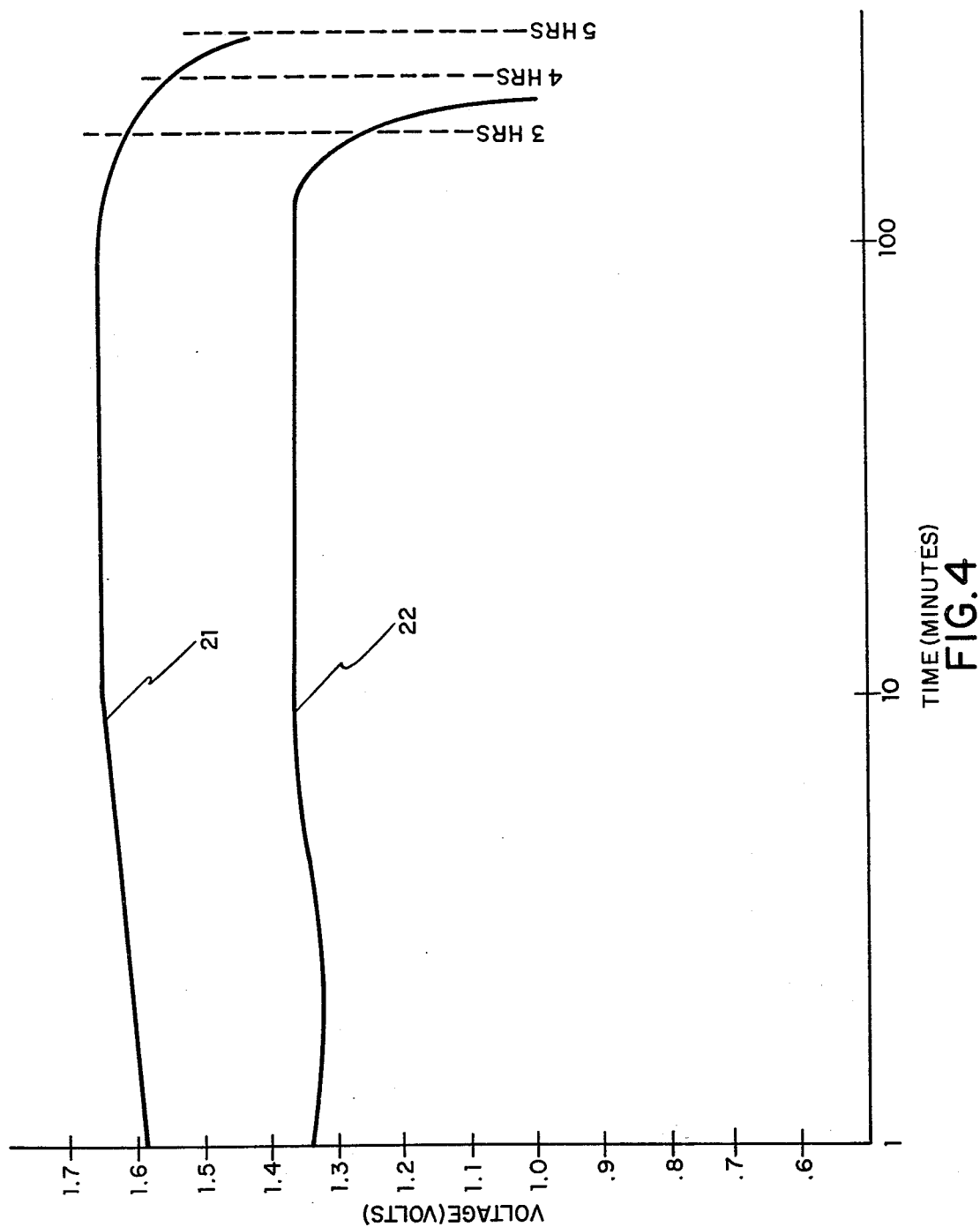

DEFERRED ACTION BATTERY HAVING AN IMPROVED DEPOLARIZER

BACKGROUND OF THE INVENTION

This invention relates to deferred action batteries having improved depolarizers. More particularly, the present invention relates to improved depolarizers for use in reserved or deferred action batteries.

Silver chloride-magnesium sea water activated batteries are well known and have been in use for many years. However, these batteries are not only expensive but consume, without possibility of salvage, a relatively scarce precious metal. There have been many attempts in the past to develop a non-silver bearing depolarizer. Such compounds as cuprous chloride, cuprous iodide, lead chloride are examples of depolarizers which have been used in the past in sea water activated batteries. However, many of these batteries have suffered the disadvantage of having a relatively short operating life, short storage life, or rapidly deteriorate when stored under high humidity conditions.

In view of the foregoing, it should now be understood that it would be desirable to provide an improved battery having an improved depolarizer that would solve the above and other problems.

Accordingly, one of the objects of the present invention is to provide a reserve or deferred action battery which eliminates or minimizes the use of strategic materials such as silver.

Another object of this invention is to provide a cathode depolarizer that is relatively insensitive to moisture so as to enable long storage periods at high temperatures and high humidity without degradation.

Yet another object of the present invention is to provide a reserve or deferred action battery which does not suffer from the disadvantages of the prior art batteries and yet will perform as good or better than the prior art batteries.

SUMMARY OF THE INVENTION

In carrying out the above and other objects of the invention in one form, I provide an improved deferred action battery. The deferred action battery has an improved depolarizer. In one embodiment, the depolarizer comprises heavy metal derivatives of aliphatic dicarboxylic acids such as copper oxalate. In another embodiment, the depolarizer comprises heavy metal derivatives of aliphatic monocarboxylic acids such as copper formate. In yet another embodiment the depolarizer comprises heavy metal derivatives of aliphatic hydroxy acids such as copper citrate and copper tartrate. In order for the depolarizers to function properly, a conductive material must be added. Carbon is preferred for this purpose because of its low cost and ready availability. Any of the various forms of carbon, such as graphite, acetylene black, or petroleum coke may be added to the depolarizer to make it conductive. In addition, a binder, such as sulphur, must be added to impart cohesion to the depolarizer. An electrical conductor such as a metal grid is then used as a current collector and as a base for the cathode upon which the depolarizer is used. The other electrode of the battery is an anode made from any suitable material such as magnesium, magnesium alloy, zinc, or aluminum. A small amount of aromatic thio deriviatives of semicarbazone such as dithizone added to the depolarizer improves performance of the depolarizers.

This deferred action battery can be activated by ordinary sea water or distilled water or any other suitable liquid. Alcohol could be used as an electrolyte although its performance would not be as good as water. However, alcohol or other suitable material could be used as an anti-freeze added to the electrolyte.

The subject matter which I regard as my invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 2 shows performance curves of a copper oxalate depolarizer;

FIG. 3 shows performance curves of copper citrate and copper formate depolarizers; and FIG. 4 shows performance curves of copper tartrate depolarizers.

DESCRIPTION OF THE PREFERRED EMBODIMENTS

Figure 1:
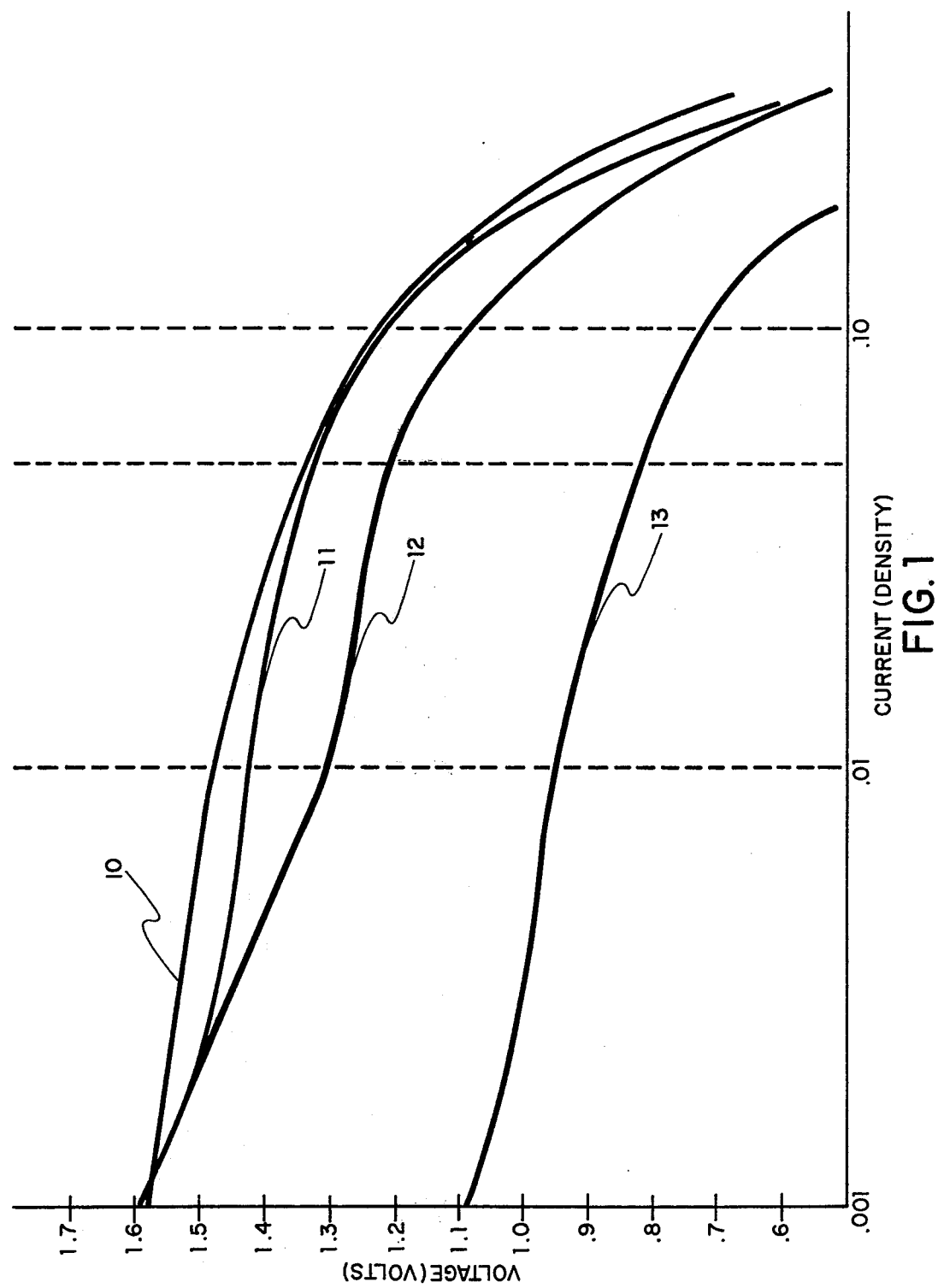
FIG. 1 is a group of polarization curves comparing a copper oxalate depolarizer with various prior art depolarizers.

To facilitate the explanation of the present invention in detail, the construction of a typical deferred action battery is first described. A battery having an improved depolarizer in accordance with the present invention is then compared with several batteries of the prior art. Other improved depolarizers in accordance with the present invention are then described.

A typical reserve or deferred action battery has two electrodes known as a cathode and an anode. The battery is activated by addition of an electrolyte. In many deferred action batteries, the electrolyte can be water ranging from distilled water to sea water. The electrodes are normally enclosed in a housing or case to hold the electrolyte and to provide a protective surrounding for the electrodes. If the battery is intended to be activated by sea water by dropping the battery in the ocean then the case can have holes at the top and bottom to allow the sea water to enter easily. A reserve or deferred action battery is one that has no output voltage until an electrolyte is added. A primary battery is one that has an electrolyte but is not rechargeable. Therefore, a battery in accordance with the present invention can be said to be a deferred action primary battery since it is not intended to be recharged. Typically a battery having a magnesium anode is not rechargeable since the reaction is not reversible, however, if a zinc anode is used the battery can be considered to be rechargeable although it cannot be recharged to its original capacity. The output power of a battery having a magnesium anode is higher than a battery having a zinc anode. However, a zinc anode does not produce as much solid and gaseous corrosion products as does a magnesium anode and therefore may be more suitable in a long life application.

An example of an improved battery made in accordance with my invention comprises a magnesium or magnesium alloy anode, a cathode having a depolarizer such as copper oxalate, sulphur, and carbon such as acetylene black or graphite formed on a conductive metal grid. The anode of the battery could be in the form of a flat sheet or any other convenient configuration and could consist of alkali and alkaline earth metals. A commercially available magnesium alloy suitable for the anode carries the designation AZ61 and has the approximate composition of 6.5 percent aluminum, 0.7 percent zinc, 0.2 percent manganese with the remainder magnesium. A copper oxalate depolarizer has approximately 70 to 80 percent copper oxalate, 15 percent sulphur and 5 to 15 percent carbon. In most cases, cathode depolarizers are produced from powders and in many situations it is desirable to increase the electrical conductivity of the powder. One may add various portions of non-reactive conductive materials to obtain the desired electrical conductivity. Carbon is a preferred material for this purpose because of its low cost and ready availability. Any of the various forms of carbon, such as acetylene black, graphite or petroleum coke can be used. A binder is also required to hold the powder together. Sulphur is a preferred binder since it has been found to be more efficient than an epoxy resin. The use of sulphur in battery cathodes is old in the art of batteries. An electrical conductor such as a metal grid which may be in the form of a screen, expanded metal, or perforated sheet stock is used to form the cathode. The powder is pressed on and into the metal grid. The metal grid not only performs as an electron collector but also lends strength and rigidity to the pressed powder cathode.

In addition to the anode and cathode, a spacer must be provided to separate the electrodes from one another. Yet the spacer must be in such a form as to allow free access of electrolyte between the electrodes and to allow corrosion products resulting from the electrochemical reaction to exit from the cell. This spacer must be nonconductive and can be in the form of a small disc, rods or mesh. Chemical reaction between a magnesium anode and the electrolyte produces hydrogen gas and magnesium hydroxide. The gaseous products should be allowed to escape from between the electrodes. The escape creates a pumping action which helps pull the solid corrosion products (magnesium hydroxide) out of the space and causes new electrolyte to enter. It will be understood by those skilled in the art that the solid corrosion products not removed from between the electrodes must be kept wet.

Ordinary tap water can be used as an electrolyte although sea water is preferred. Maximum power level will be reached faster with salt water than with distilled water. Salt increases the conductivity of the electrolyte by reducing the resistance of the electrolyte.

The battery assembly is completed by the attachment of lead wires to the electrodes and enclosing everything within a suitable encasement. The lead wires must extend from the encasement and the encasement must have openings so that the electrolyte can be allowed to enter between the electrodes. Those skilled in the art will understand that the electrochemical reaction between the electrodes and the electrolyte will generate heat and allowances must be made for the generated heat.

A depolarizer is necessary in batteries to decrease polarization during current flow. A depolarizer is defined as a material which when used in conjunction with a cathode in an electrochemical system prevents polarization by preventing hydrogen gas formation at the cathode. Polarization means that the battery output voltage drops prematurely. The depolarizer maintains the electrode at a positive level by reacting with the nascent hydrogen formed at the electrode to form a compound which effectively prevents the formation of the hydrogen gas. As the cathode reducing reactions occur positive ions are discharged thereby forming negative ions. Or in other words, elements are reduced from a higher to a lower valence state.

FIG. 1 shows polarization curves for batteries having depolarizers of the prior art and a battery having an improved depolarizer of copper oxalate. The voltage out of the battery is shown in volts along the ordinate while the current density in amperes per square inch is shown along the abscissa. Curve 10 is for a battery having a depolarizer comprised of heavy metal derivatives of aliphatic dicarboxylic acids such as copper oxalate. The battery was submerged into an electrolyte maintained at a temperature of zero degrees centigrade with the electrolyte having a salinity of 1.5 percent by weight. The cathode area was eight square inches with a separation from the anode of 0.052 inches. Curve 11 is the polarization curve for a battery having a silver chloride depolarizer. Curve 12 is for a battery having a cuprous iodide depolarizer, while curve 13 is for a battery having a lead chloride depolarizer. It will be noted that curve 10 which uses the improved depolarizer maintains a higher output power than the prior art batteries although all the batteries have similar physical dimensions.

FIG. 2 shows performance curves for a battery using a copper oxalate depolarizer. The output voltage in volts is shown along the ordinate while the time in minutes is shown along the abscissa. Curve 16 represents the output when the battery was submerged into a 35 degree centigrade electrolyte having 3.6 percent by weight salinity. Curve 17 is for the battery at zero degrees centigrade with an electrolyte of 1.5 percent salinity by weight. For this example, the cathode area was eight square inches with a separation of 0.052 inches from the anode. The depolarizer had approximately 80 percent copper oxalate, 15 percent sulphur, and 5 percent carbon. The load on the battery was 6 ohms.

FIG. 3 shows two performance curves for batteries using two different depolarizers. Curve 18 is for a battery having a depolarizer comprising copper citrate while curve 19 is for a battery having a depolarizer comprising copper formate. Both batteries had magnesium anodes. Each cathode was 6.4 square inches with a separation of 0.052 inches from the anode. The batteries were submerged into an electrolyte maintained at a temperature of zero degrees centigrade and the electrolyte had a salinity of 1.5 percent by weight. The load on the batteries was 7.9 ohms.

FIG. 4 shows performance curves for a battery having an improved depolarizer comprising copper tartrate with a magnesium anode. Curve 21 shows the battery performance at 35 degrees centigrade with an electrolyte of 3.6 percent by weight salinity. Curve 22 shows the battery performance at zero degrees centigrade and having an electrolyte with a salinity of 1.5 percent by weight. The cathode area in both cases was 6.4 square inches with a separation of 0.052 inches from the anode. The depolarizer had approximately 70 percent copper tartrate, 20 percent sulphur, and 10 percent carbon. The load on the battery was 7.9 ohms.

I have found that by adding approximately 1 percent by weight of an aromatic thio derivative of semicarbozone such as dithizone to the depolarizer mix improves the performance of the battery. However, the addition of more than 2 percent by weight of dithizone to the depolarizer mix degrades rather than improves performance of these depolarizers.

All batteries having my improved depolarizer that were tested had depolarizers comprising approximately seventy to eighty percent heavy metal derivatives such as copper oxalate, copper tartrate, copper citrate, or copper formate and approximately fifteen percent sulphur with five to fifteen percent carbon.

By now it should be appreciated that I have provided improved depolarizers for use with deferred action batteries which do not contain nor require precious metals. These improved batteries, however, are very competitive in performance to prior art deferred action batteries, and yet, do not suffer from disadvantages of the prior art batteries.

Consequently, while in accordance with the Patent Statutes, I have described what at present are considered to be the preferred forms of my invention it will be obvious to those skilled in the art that numerous changes and modifications may be made herein without departing from the spirit and scope of the invention, and it is therefore aimed in the following claims to cover all such modifications.

What I claim as new and desire to secure by Letters Patent of the United States is:

1. A deferred action, sea water activated battery having an anode selected from the group consisting essentially of magnesium, aluminum, and zinc, the improvement comprising a cathode depolarizer having a conductive metal grid and coated with cupric oxalate, sulphur and carbon.

2. The battery of claim 1 wherein the carbon is acetylene black.

3. The battery of claim 1 wherein the carbon is graphite.

4. The battery of claim 1 wherein the anode is a magnesium alloy having substantially 6.5 percent aluminum, 0.7 percent zinc and 0.2 percent manganese with the remainder magnesium.

5. A deferred action battery having an anode selected from the group consisting essentially of magnesium, aluminum, and zinc and comprising a cathode depolarizer produced from a powder having 70 to 80 percent heavy metal derivatives of aliphatic dicarboxylic acids wherein the heavy metal derivative is copper oxalate, 15 percent sulphur and 5 to 15 percent carbon, which is pressed on and into a metal grid.

6. A deferred action battery having an anode selected from the group consisting essentially of magnesium, aluminum, and zinc with a cathode depolarizer comprising a conductive material, a binder and heavy metal derivatives of aliphatic monocarboxylic acids wherein the heavy metal derivative includes copper formate.

7. The battery of claim 6 wherein the anode contains alkali or alkaline earth metals.

8. The battery of claim 6 wherein the depolarizer also contains between one percent and three percent of aromatic thio derivates of semicarbazone wherein the aromatic thio derivate includes dithizone.

9. A deferred action battery having an anode selected from the group consisting of magnesium, aluminum, and zinc with a cathode depolarizer comprising a conductive material, a binder and heavy metal derivates of aliphatic hydroxy acids selected from the class consisting of copper citrate and copper tartrate.

10. The battery of claim 9 wherein the depolarizer also contains between one percent and three percent of aromatic thio derivates of semicarbazone wherein the aromatic thio derivative includes dithizone.

11. The battery of claim 9 wherein the depolarizer also contains sulphur as a binder and carbon as a non-reactive conductive material.

12. A deferred action battery having an anode selected from the group consisting of magnesium, aluminum, and zinc with a cathode depolarizer comprising a conductive material, a binder and heavy metal derivates of aliphatic dicarboxylic acids, wherein the heavy metal derivate includes copper oxalate.

13. The battery of claim 12 wherein the depolarizer also contains sulphur as a binder and a non-reactive conductive material.

14. The battery of claim 13 wherein the non-reactive conductive material is a carbon.

* * * * *